United States Patent
Lichterman

(10) Patent No.: US 6,363,372 B1
(45) Date of Patent: Mar. 26, 2002

(54) METHOD FOR SELECTING UNIQUE IDENTIFIERS WITHIN A RANGE

(75) Inventor: Kevin Lichterman, Schaumburg, IL (US)

(73) Assignee: Zenith Electronics Corporation, Glenview, IL (US)

( * ) Notice: Subject to any disclaimer, the term of this patent is extended or adjusted under 35 U.S.C. 154(b) by 0 days.

(21) Appl. No.: 09/064,302

(22) Filed: Apr. 22, 1998

(51) Int. Cl.[7] .............................................. G06F 17/30
(52) U.S. Cl. .............................. 707/3; 707/7; 707/101; 707/200; 711/209; 379/213
(58) Field of Search ..................... 707/1–7, 100–102, 707/200; 711/202, 206, 209; 379/210–213; 704/10

(56) References Cited

U.S. PATENT DOCUMENTS

| | | | | |
|---|---|---|---|---|
| 5,440,734 A | * | 8/1995 | Wagar | 707/1 |
| 5,487,164 A | * | 1/1996 | Kirchhofer et al. | 707/7 |
| 5,542,089 A | * | 7/1996 | Lindsay et al. | 707/7 |
| 5,551,018 A | * | 8/1996 | Hansen | 707/7 |
| 5,613,110 A | * | 3/1997 | Stuart | 707/1 |
| 5,680,607 A | * | 10/1997 | Brueckheimer | 707/7 |
| 5,729,732 A | * | 3/1998 | Gal et al. | 707/7 |
| 5,745,889 A | * | 4/1998 | Burrows | 707/2 |
| 5,870,752 A | * | 2/1999 | Gibbons et al. | 707/102 |
| 5,897,637 A | * | 4/1999 | Guha | 707/101 |

\* cited by examiner

*Primary Examiner*—Hosain T. Alam

(57) ABSTRACT

A method for selecting a next available identifier. A plurality of unique identifiers are assigned, preferably in blocks, to each of a plurality of banks. Within each of the banks, when empty, there is one available minimum value identifier and one available maximum value identifier. A number of resident identifiers are counted in each of the banks and at least one bank having a lowest counted number is identified. Within the first available bank, a highest value of all resident identifiers is determined. In the first available bank, the highest value is compared to a maximum value. If the highest value is less than the maximum value, then the next available identifier is equal to a sum of the highest value plus an incremental value. When a check bank counter is set at a value or when the next available unique identifier is a value outside of a range of the corresponding bank, the next available bank is selected and an iteration process begins in the next available bank.

18 Claims, 2 Drawing Sheets

METHOD FOR SELECTING UNIQUE IDENTIFIERS WITHIN A RANGE

BACKGROUND OF THE INVENTION

1. Field of the Invention

This invention relates to an efficient method for determining and selecting a next available unique identifier from a group of unique identifiers.

2. Description of Prior Art

Conventional methods are used to assign a unique integer number for various applications which require identification of a unique number. For example, new telephone numbers are assigned by identifying deleted, used or otherwise available telephone numbers, such as those which either have not been previously assigned or which have expired. It is also necessary, for example, to identify expired or unissued unique numbers for credit card applications.

Conventional methods have also been used to assign a unique numeric tag to each program as programs are stored in a database. Some conventional methods use a linear approach for determining an available program number from a range of unique program numbers available, from a minimum value to a maximum value, to a database.

A conventional linear approach includes a linear search that starts at a minimum allowable integer and the search function checks a number or value versus the used numbers or values in the database. If the minimum allowable number or value is not used in the database that number is defined as a unique identifier. Otherwise, the next ascending number is checked. This iteration continues until all possible numbers are checked. This conventional method requires constant queries of the database which is slow and inefficient.

There is an apparent need for a method which is more efficient than the conventional linear method for determining a next available program number or other identifier.

SUMMARY OF THE INVENTION

It is one object of this invention to provide an efficient method for finding a unique integer from a range of acceptable integers by dividing the range of acceptable integers into a number of equally sized banks and using a maximum value of the integer in each bank plus one as a unique integer value.

It is another object of this invention to provide a method that first employs a search for maximum values of identifiers within a bank, and then defaults to conventional method steps, such as the previously mentioned conventional method steps, if the maximum value approach unsuccessfully identifies an available identifier after a specified number of tries.

One particular use for the method of this invention is to assign a unique program number to each program that a third party may transmit by any suitable transmission system. Transmitted programs may contain information such as a program title, a program description, a channel on which the program can be accessed, and a start time or a stop time of a program. For example, the numeric value 5 can be used to identify a program 'NEWS' which has a program description 'LOCAL 5 O'CLOCK NEWS', such as on television channel 5. Such program information can be stored in a database and later downloaded to an end user facility. For example, program information identifying television, radio or computer transmissions can be downloaded to and displayed at the end user facility, which may be a television, a cable box, a computer, a telephone or the like.

Any suitable type of database which supports a form of structured query language (SQL) can be used to store programs. Each program in the database has a unique identifier assigned to the particular program, for future use. In one preferred embodiment of this invention, the unique identifiers will be a group of integer numbers. The size of the group can vary as a function of the data.

Because certain programs may expire or be deleted, previously assigned unique identifiers again become available, but not necessarily in a sequential order. Thus, it is necessary to search the group of unique identifiers to determine which, if any, unique identifiers are currently available to qualify as a next available identifier.

In an effort to minimize the number of times that a database must be queried, it is possible to divide an overall range of unique identifiers into a series of banks each having a plurality of unique identifiers. In one preferred embodiment according to this invention, each of the banks, when empty, has an available minimum value identifier and an available maximum value identifier. The total quantity of resident identifiers in each bank can be counted and used to find the bank of identifiers that is most empty.

Once the resident identifiers are counted, which may correspond to a quantity of programs in a database bank for example, a first available bank having a lowest counted number of resident identifiers is determined. Within the first available bank, a highest value of the resident identifiers is also determined, for example, by using a SQL 'MAX' query. Within the first available bank, the maximum value of the resident identifiers is compared to an available maximum value an identifier may have in a particular bank.

When the highest value is less than the maximum value, within the first available bank, the next available identifier can be assigned as a sum of the highest value plus a defined incremental value. However, if the highest value is greater than or equal to the maximum value, in the first available bank, the method of this invention then identifies a second available bank which has a lowest counted number equal to or less than the lowest counted number of the first available bank. In the second available bank, a highest value of the unique numbers is determined. The highest value is compared to a maximum value an identifier may take on in the second available bank.

If the highest value is less than the maximum value, in the second available bank, the next available identifier is assigned a value equal to a sum of the second highest value plus the incremental value. However, in one preferred embodiment of this invention, if the highest value in the second available bank is greater than or equal to the maximum value in the second available bank, then the method of this invention defaults to linearly searching the second available bank to determine the next available identifier.

The unique identifier found is stored as a last maximum identifier. When subsequent unique identifiers are requested, a bank of integers may not be determined and a new maximum does not necessarily need to be found using the SQL MAX query. The last maximum value stored plus one is a new unique identifier, as long as such value does not exceed the maximum value allowable in the database bank. New banks of integers are selected in at least two instances: (1) when a maximum value plus one in the database bank exceed; an upper limit of acceptable values in the database bank; and (2) at the start of the program, such as via initialization of a check bank counter to a size greater than the size of the database bank.

DESCRIPTION OF PREFERRED EMBODIMENTS

Figure 1:
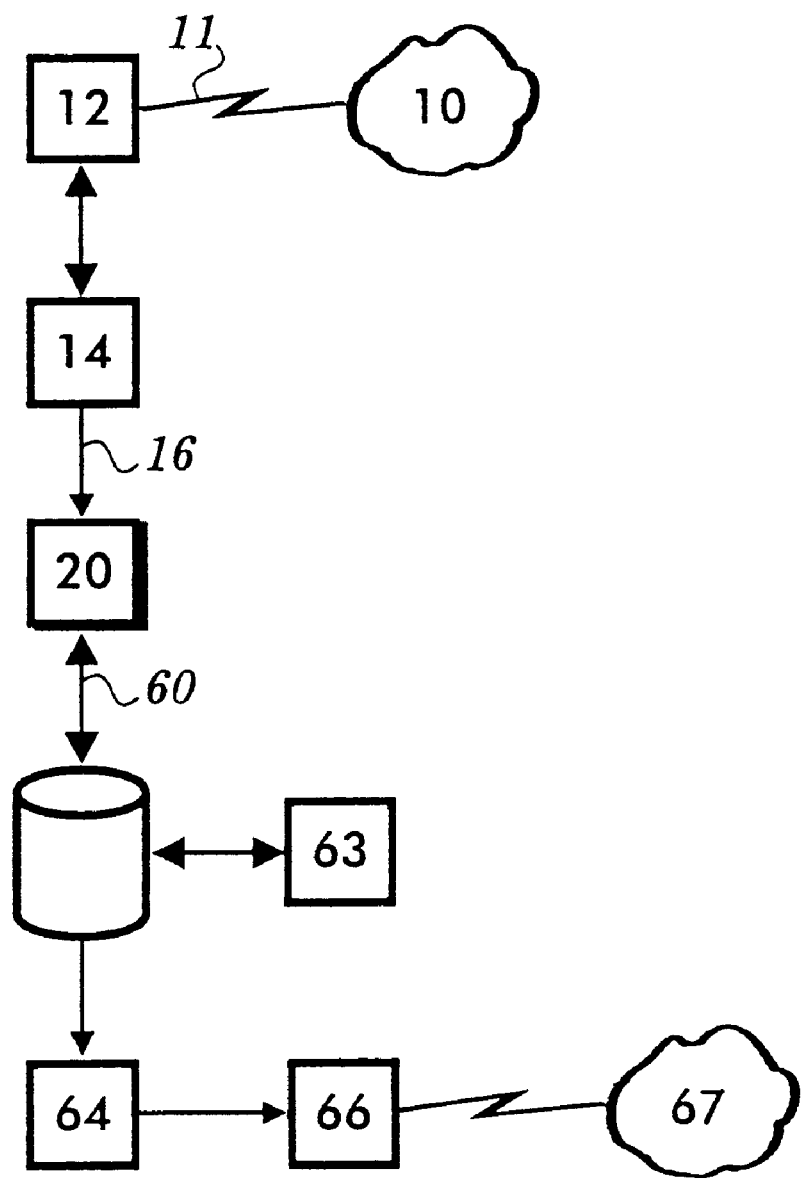
FIG. 1 is a schematic flow diagram showing an overview of a data handling system, according to one preferred embodiment of this invention.

As shown in FIG. 1, data provider 10 sends data, such as a program, via data transmission 11. It is apparent that data transmission 11 can occur by any suitable conventional method known to those skilled in the art of transmitting data. For example, data can be transmitted through a cable, a wire, a frequency transmission or any other suitable system for transmitting data.

Figure 2:
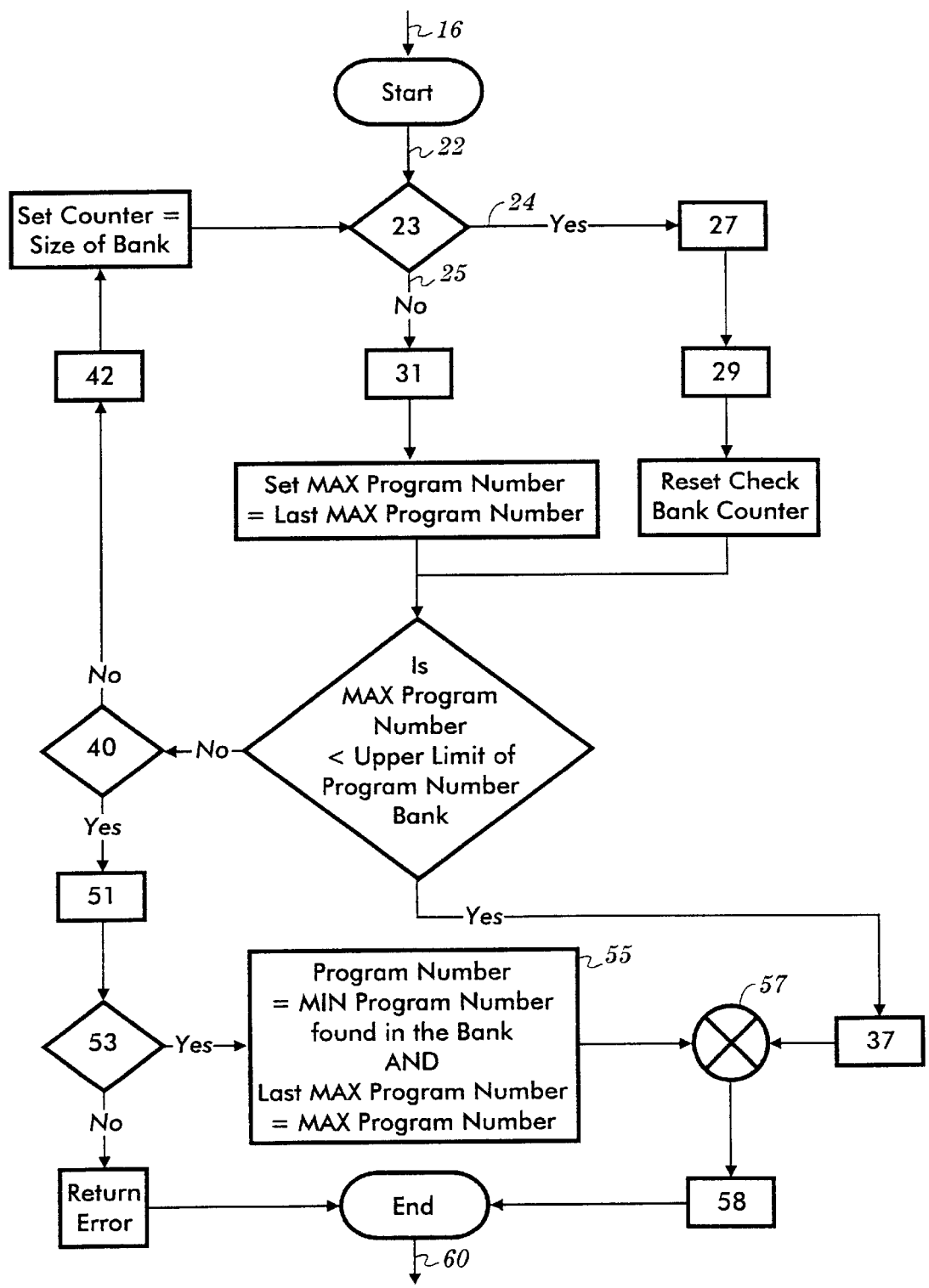
FIG. 2 is a block flow diagram showing a method for selecting a next available identifier, according to one preferred embodiment of this invention.

In one preferred embodiment according to this invention, the data is transmitted to receiver 12, which passes received data to data translator 14. If necessary, data translator 14 converts data into a particular format and transmits the formatted data to system 20. FIG. 2 shows system 20 according to one preferred embodiment of this invention and is more specifically described later in this specification and throughout the claims.

As shown in FIG. 1, system 20 emits identified data 60 to database 62. Database 62 can receive information from or transmit information to system 20. Particular data, such as deleted data, expired data and the like can be purged through eliminator 63.

At any particular time, identified data 60 can be extracted from database 62 and transmitted to downloader 64. Downloaded information, such as identified data 60, can then be sent via data transmission 66 to user 67. In one preferred embodiment according to this invention, user 67 is a cable plant and provider 10 is an electronic program guide vendor.

It is apparent that system 20 of this invention can be used for other purposes than those shown in FIG. 1. For example, system 20 of this invention can be used to identify, select and assign expired, deleted or unused unique identifiers. For example, system 20 can be used to identify, select and assign unique numbers, such as those used for telephone numbers, for credit card numbers, for personal identification or for any other suitable use.

FIG. 2 shows a flow diagram of a method for selecting a next available identifier, according to one preferred embodiment of this invention. As shown in FIG. 2, the method preferably begins with receiving data through data transmission 16. All programs, for example, those transmitted by data provider 10, require unique identifiers. A plurality or block of unique identifiers are assigned to each of a plurality of banks. In one preferred embodiment of this invention, each bank contains a block of unique identifiers so that each unique identifier is unique among all identifiers within all banks. When empty, each of the banks has an acceptable range of unique integers or identifiers that may be assigned. According to one preferred embodiment of this invention, to program numbers this range of values is from the lower integer of the bank to the upper integer of the bank. The bank may hold a number of unique identifiers wherein the number of unique identifiers in the bank is equal to the upper limit value minus the lower limit value. When a particular bank is empty, all identifiers are available and no resident identifier exists within such empty bank.

A resident identifier relates to an identifier that is no longer available within a particular bank, but rather the identifier corresponds to and labels or identifies a particular program or anything else that returns a unique identifier.

In one preferred embodiment according to this invention, each unique identifier comprises a unique number, preferably a unique integer number. Each number can be represented by a binary number or by a number defined by any other suitable number system. It is apparent that the identifier can also comprise an alpha component, or any other suitable component that can be assigned a value.

As shown in FIG. 2, when initialized at step 22, a check bank counter is initialized to equal a size or quantity, such as the number of identifiers a bank may contain, of each bank, so that during start-up, the method of this invention automatically proceeds to step 24, the YES path from decision block 23. In one preferred embodiment of this invention, the method of this invention counts, a number of resident identifiers in each of the banks and sets a plurality of counted numbers corresponding to each of the banks. As used throughout this specification and in the claims, the term counted number is intended to be interchangeable with the term counted identifier. At step 27, a first available bank, of all the existing banks, which has a lowest counted number of resident identifiers is identified. It is apparent that any suitable search and identify function known to those skilled in the art of programming can be used to compare all counted numbers, arrange all counted numbers in ascending order and/or select the lowest counted number. In this embodiment, a SQL count of numbers in each of the banks is used. It is apparent that two or more of the banks can have a same or a different lowest counted number of resident identifiers. If two or more of the banks have a same lowest counted number of resident identifiers, then either of the banks can be selected first, depending upon a predetermined priority scheme, such as in the order counted.

When the first available bank is identified, a highest value of the resident identifiers within the first available bank is determined. In one preferred embodiment according to this invention, the highest value corresponds to one of the resident identifiers within the first available bank, or the lower limit of the bank if the bank is empty. Determining the highest value of the resident identifiers is shown as occurring at block 29 of FIG. 2.

Once a bank is found, the check bank counter is set to zero.

At decision block 35, the highest value of the resident identifiers in the first available bank is compared to the available maximum value identifier in the first available bank. If the highest value is less than the maximum value an identifier may have in the first available bank, then the method of this invention assigns the next available identifier and also assigns a last highest value, both in the first available bank, equal to a sum of the highest value plus a predetermined or set incremental value. In one preferred embodiment according to this invention, which uses numbers as identifiers, the next available identifier can be equal to a sum of the highest number in the first available bank plus unity or one. Block 37 of FIG. 2 shows a step corresponding to the calculation or assignment of the next available identifier, when the highest value is less than the maximum value in the first available bank.

At decision block 35, if the highest value in the first available bank is greater than or equal to the maximum value in the first available bank, then a second available bank of the banks is identified. The second available bank preferably has a second lowest counted number, of all the counted numbers, that each correspond to a different one of the banks. The second lowest counted number is either equal to the first lowest counted number or is greater than the first lowest counted number, in the first available bank.

At decision block 40 of FIG. 2, a flag is set when the second available bank is identified. Thus, if a flag is not set when at decision block 40, the method of this invention proceeds to block 42 wherein a flag is set to indicate that the second available bank has been identified. Within the second available bank, a highest value of the unique identifiers is determined. Because the different banks each contain unique numbers, the highest value in the second available bank is preferably unique with respect to the highest value in the first available bank. The highest value in the second available bank is compared to a maximum value of the available maximum value identifier in the second available bank. When the highest value is less than the maximum value, in the second available bank, then the next available identifier is assigned and the last highest value in the second available bank is assigned a value equal to a sum of the highest value in the second bank plus the incremental value.

At decision block 40, if the flag is set and thus the second available bank has been identified, the method of this invention can proceed with the linear search, as represented by blocks 51 and 55 and by decision block 53.

If the highest value in the second available bank is greater than or equal to the maximum value in the second available bank, then the second available bank is linearly searched to determine the next available identifier. The linear searching function can be performed according to any suitable conventional linear method. For example, within a particular bank, such as the second available bank, a search can be performed from a lower boundary identifier of the unique identifiers having a lowest value of the unique identifiers to an upper boundary identifier of the unique identifiers having a highest value of the unique identifiers, in the second available bank. In one preferred embodiment of this invention, Ile linear search looks for the next available identifier in the second available bank by detecting more than the incremental value between one of the identifiers in the second available bank and a next consecutive one of the identifiers in the second available bank. The linear search can compare the first identifier to the second identifier and determine whether a difference between the first identifier and the second identifier is greater than the incremental value. The linear search can then compare the second identifier value to the third identifier value to determine if a difference between the second identifier value and the third identifier value is greater than the incremental value, and the linear search will sequentially continue in such fashion. The search will begin at the lower limit of the bank once the linear search detects more than an incremental value between two sequentially consecutive identifiers, the method of this invention can then add the incremental value to a lower value of the lower order identifier. For example, in one preferred embodiment of this invention wherein numbers represent the identifiers, if the incremental value is predetermined or set to unity or one, then if the difference between two consecutive identifiers is greater than one, for example is two or more, the next available identifier is assigned a value of the lower of the two consecutive identifiers plus unity or one.

Thus, according to the method of this invention, if the search for the maximum values results in not assigning the next available identifier, the method of this invention defaults to a conventional method or system wherein the next available identifier is determined in a linear fashion.

As shown in FIG. 2, the exclusive or function 57 transmits the next available identifier, determined by either the maximum value analysis or the linear analysis, to block 58 which then transmits to database 62 a unique next available identifier, for example a unique next available program number as identified data 60.

At decision block 23, if the bank is not full and has available unique identifiers, then the counted number is incremented at step 31 and the available maximum value identifier is set and also equals the last maximum value identifier. This assignment in the same bank provides the greatest time saving in this method. The path at step 31 eliminates the SQL queries, the slowest part of the code.

In one preferred embodiment according to this invention, a bank can hold 3,000 programs and thus can have 3,000 unique identifiers, such as integer numbers 1–3,000. If the next serial bank has a size of 3,000, then the range of unique integer numbers is from 3,001–6,000. Likewise, the third serial bank of the same size would have a range of unique integer numbers from 6,001–9,000.

EXAMPLE

In a range of integers that each has a unique number or value, wherein the range is from 1 to 100, the range can arbitrarily be divided into four banks with 25 integers in each bank. On start-up, the check bank counter is set at greater than 25 to force a bank select function. The range of the second bank would have a lower limit equal to the value 26 and an upper limit equal to the value 50. If the second bank contains two resident values, such as 26 and 27, the maximum resident identifier would be 27 and thus 27 plus 1, or 28 would be the next available unique identifier, which is in the second bank.

The method of this invention can yield a 67% improvement in performance, compared to a conventional linear method on an empty database.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A method for selecting a next available identifier, the method comprising the steps of:

breaking an acceptable range of integer values that a plurality of unique identifiers may take into a number of banks;

assigning the unique identifiers to each of the banks so that within each of the banks when empty there is a minimum value identifier and a maximum value identifier;

counting a number of resident identifiers in each of the banks and setting a plurality of counted numbers that each correspond to a different one of the banks;

identifying a first available bank of the banks having a lowest counted number of the counted numbers;

determining a highest value of the resident identifiers in the first available bank;

comparing the highest value in the first available bank to a maximum value of the available maximum value identifier in the first available bank; and when the highest value is less than the maximum value, assigning the next available identifier and a last highest value in the first available bank equal to a sum of the highest value plus an incremental value.

2. A method according to claim 1 further comprising the steps of:

when the highest value in the first available bank is greater than or equal to the maximum value in the first available bank identifying a second available bank of the banks having a lowest counted number of the counted numbers.

3. A method according to claim 2 further comprising the steps of:
   determining a highest value of the unique identifiers in the second available bank;
   comparing the highest value in the second available bank to a maximum value of the available maximum value identifier in the second available bank; and
   when the highest value in the second available bank is less than the maximum value, assigning the next available identifier and the last highest value in the second available bank equal to a sum of the highest value in the second available bank plus the incremental value.

4. A method according to claim 3 further comprising the steps of:
   when the highest value in the second available bank is greater than or equal to the maximum value in the second available bank, performing a linear search of the second available bank to determine the next available identifier.

5. In a method according to claim 4 wherein linearly searching the second available bank comprises the steps of:
   searching from a lower boundary identifier of the unique identifiers having a lowest value of the unique identifiers in the second available bank to an upper boundary of the unique identifiers having a highest value of the unique identifiers in the second available bank for the next available identifier in the second available bank by detecting more than the incremental value between one of the identifiers in the second available bank and a next consecutive one of the identifiers in the second available bank.

6. In a method according to claim 5 wherein the next available identifier is equal to a sum of a lower value of the one of the identifiers plus the incremental value.

7. In a method according to claim 6 wherein an error signal is generated when a difference in value between each consecutive pair of the identifiers in the second available bank is greater than the incremental value.

8. In a method according to claim 5 wherein the incremental value is equal to unity.

9. In a method according to claim 5 wherein the resident identifiers in the second available bank are sorted in ascending order.

10. In a method according to claim 2 wherein a flag is set when the second available bank is identified.

11. In a method according to claim 1 wherein the unique identifiers are sequentially incremented.

12. In a method according to claim 1 wherein the identifiers are numbers.

13. In a method according to claim 12 wherein the incremental value is equal to unity.

14. In a method according to claim 1 wherein two of the lowest counted numbers exist.

15. In a method according to claim 1 wherein corresponding to each of the banks is a stored value representing the number of the resident identifiers in each of the banks and the stored value is updated when the number of the resident identifiers changes.

16. In a method according to claim 1 wherein the lowest counted number has a least absolute value of the counted numbers.

17. In a method according to claim 1 wherein each of the resident identifiers corresponds to and identifies a program stored in a corresponding bank of the banks.

18. In a method according to claim 1 wherein a next available bark of the banks is selected when the highest value in the first available bank is greater than the maximum value in the first available bank.

* * * * *